United States Patent
Pfaffinger et al.

(10) Patent No.: US 9,222,805 B2
(45) Date of Patent: Dec. 29, 2015

(54) CIRCUIT SYSTEM AND METHOD FOR EVALUATING A SENSOR

(75) Inventors: Christian Pfaffinger, Ruhstorf (DE); Felix Mednikov, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 1146 days.

(21) Appl. No.: 13/131,835

(22) PCT Filed: Nov. 17, 2009

(86) PCT No.: PCT/DE2009/001608
§ 371 (c)(1),
(2), (4) Date: Sep. 16, 2011

(87) PCT Pub. No.: WO2010/069284
PCT Pub. Date: Jun. 24, 2010

(65) Prior Publication Data
US 2011/0316558 A1   Dec. 29, 2011

(30) Foreign Application Priority Data
Dec. 18, 2008 (DE) .................. 10 2008 063 527

(51) Int. Cl.
*G01R 27/02* (2006.01)
*G01D 5/243* (2006.01)
*G01D 5/22* (2006.01)

(52) U.S. Cl.
CPC .............. *G01D 5/243* (2013.01); *G01D 5/2216* (2013.01)

(58) Field of Classification Search
None
See application file for complete search history.

(56) References Cited

U.S. PATENT DOCUMENTS

| | | | | |
|---|---|---|---|---|
| 3,046,535 A | * | 7/1962 | Philbin et al. | 340/870.35 |
| 4,644,570 A | | 2/1987 | Brosh et al. | |
| 4,685,678 A | * | 8/1987 | Frederiksen | 700/85 |
| 4,851,770 A | | 7/1989 | Fiori, Jr. | |
| 4,899,145 A | * | 2/1990 | Okuda et al. | 341/15 |

(Continued)

FOREIGN PATENT DOCUMENTS

DE   38 17 371 A1   11/1989
EP   0 166 706       1/1986

(Continued)

OTHER PUBLICATIONS

International Search Report for International Application No. PCT/DE2009/001608.

(Continued)

*Primary Examiner* — Melissa Koval
*Assistant Examiner* — Stephen G Armstrong
(74) *Attorney, Agent, or Firm* — Alston & Bird LLP

(57) ABSTRACT

A circuit system for evaluating a sensor, wherein the circuit system comprises two complex impedances (2, 3, 13, 14), wherein the complex impedances (2, 3, 13, 14) are each part of a resonant circuit in which the complex impedances (2, 3, 13, 14) can be excited to perform oscillations, and wherein at least one of the two complex impedances (2, 3, 13, 14) are part of the sensor, is characterized with respect to a particularly cost-effective and as simple a circuit design as possible in that a counter (9, 18) and a switch apparatus (8, 16) are provided, wherein the counter (9, 18) can be used to alternately count the oscillations of one of the two resonant circuits, the switch apparatus (8, 16) can be switched when a specifiable counter reading has been reached, and the switch signal of the switch apparatus serves as a pulse width-modulated output signal (11, 21) for the circuit system.

25 Claims, 7 Drawing Sheets

(56) References Cited

U.S. PATENT DOCUMENTS

| | | | |
|---|---|---|---|
| 4,950,988 A * | 8/1990 | Garshelis | 324/207.24 |
| 5,079,523 A | 1/1992 | Kleinhans | |
| 5,425,073 A | 6/1995 | Bitzer et al. | |
| 7,208,945 B2 | 4/2007 | Jones et al. | |
| 2001/0028248 A1* | 10/2001 | Nekado | 324/312 |
| 2010/0090688 A1 | 4/2010 | Mednikov | |

FOREIGN PATENT DOCUMENTS

| | | |
|---|---|---|
| EP | 0 166 706 A1 | 1/1986 |
| GB | 2 053 487 | 2/1981 |
| GB | 2 219 404 | 12/1989 |
| WO | WO 2008/074317 A2 | 6/2008 |

OTHER PUBLICATIONS

International Search Report for International Application No. PCT/DE2009/001608, mailed Jun. 15, 2010.

International Preliminary Report on Patentability for International Application No. PCT/DE2009/001608, mailed Jun. 21, 2011.

* cited by examiner

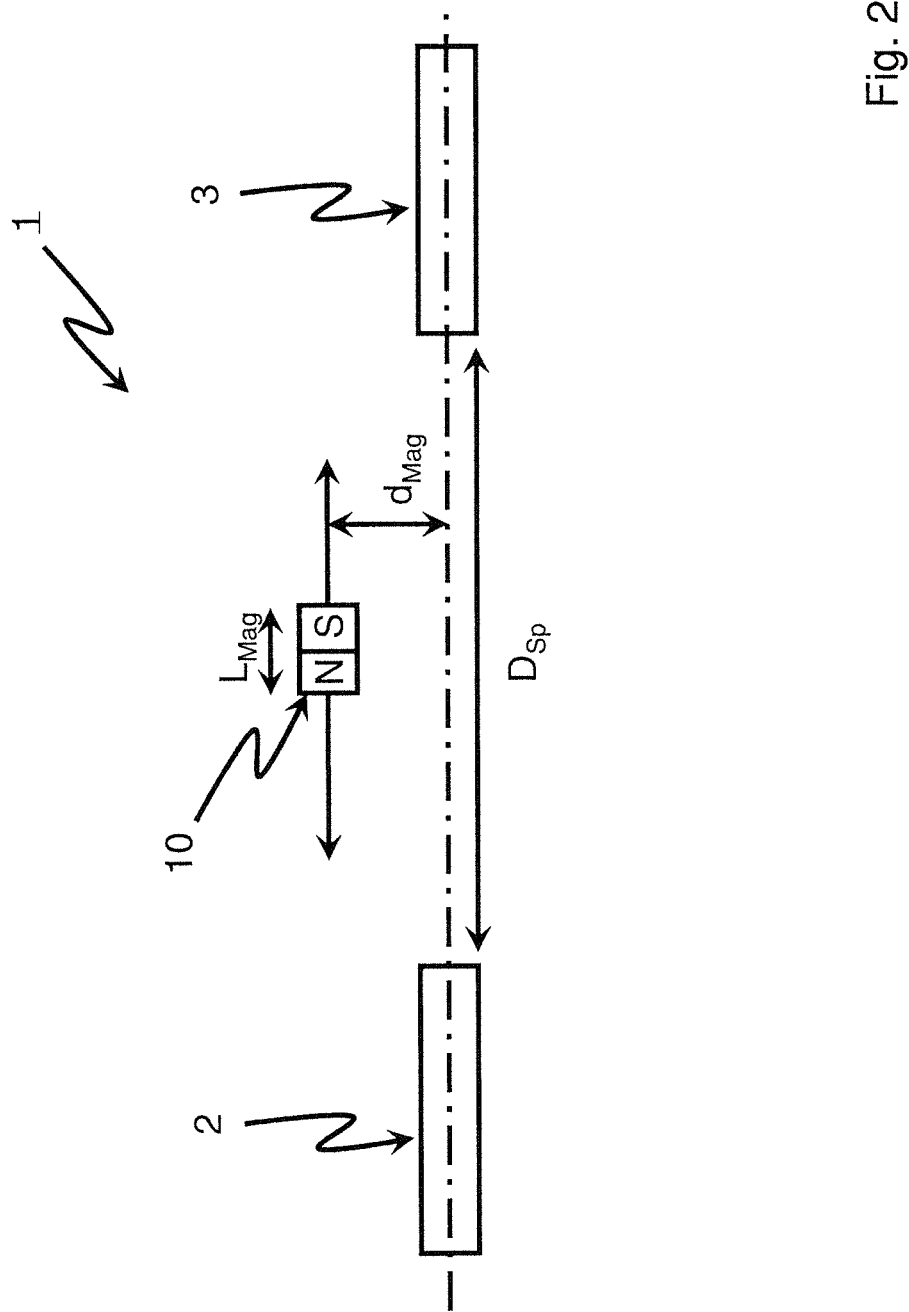

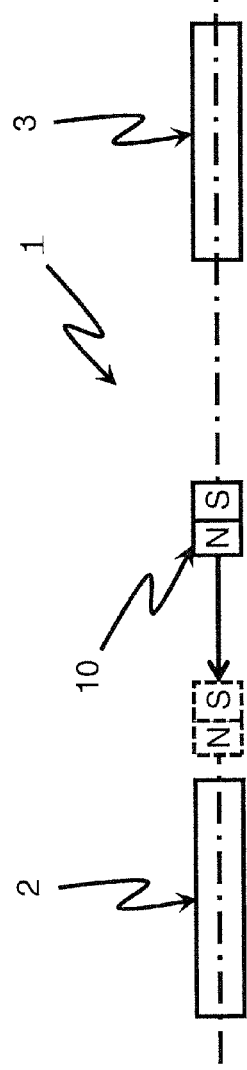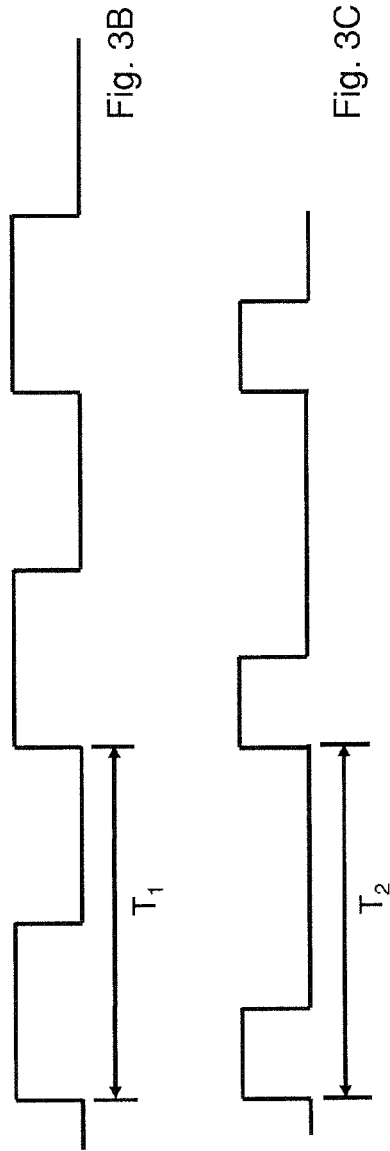

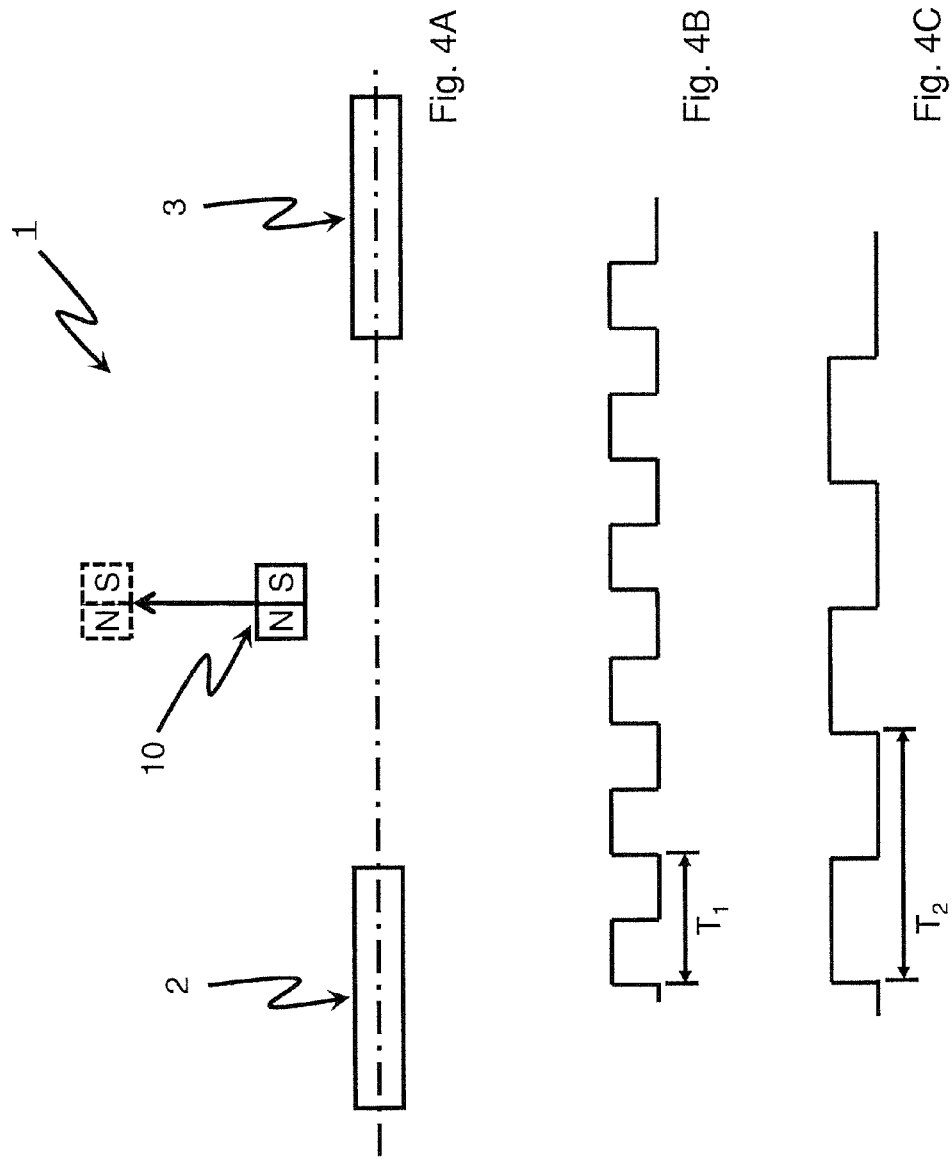

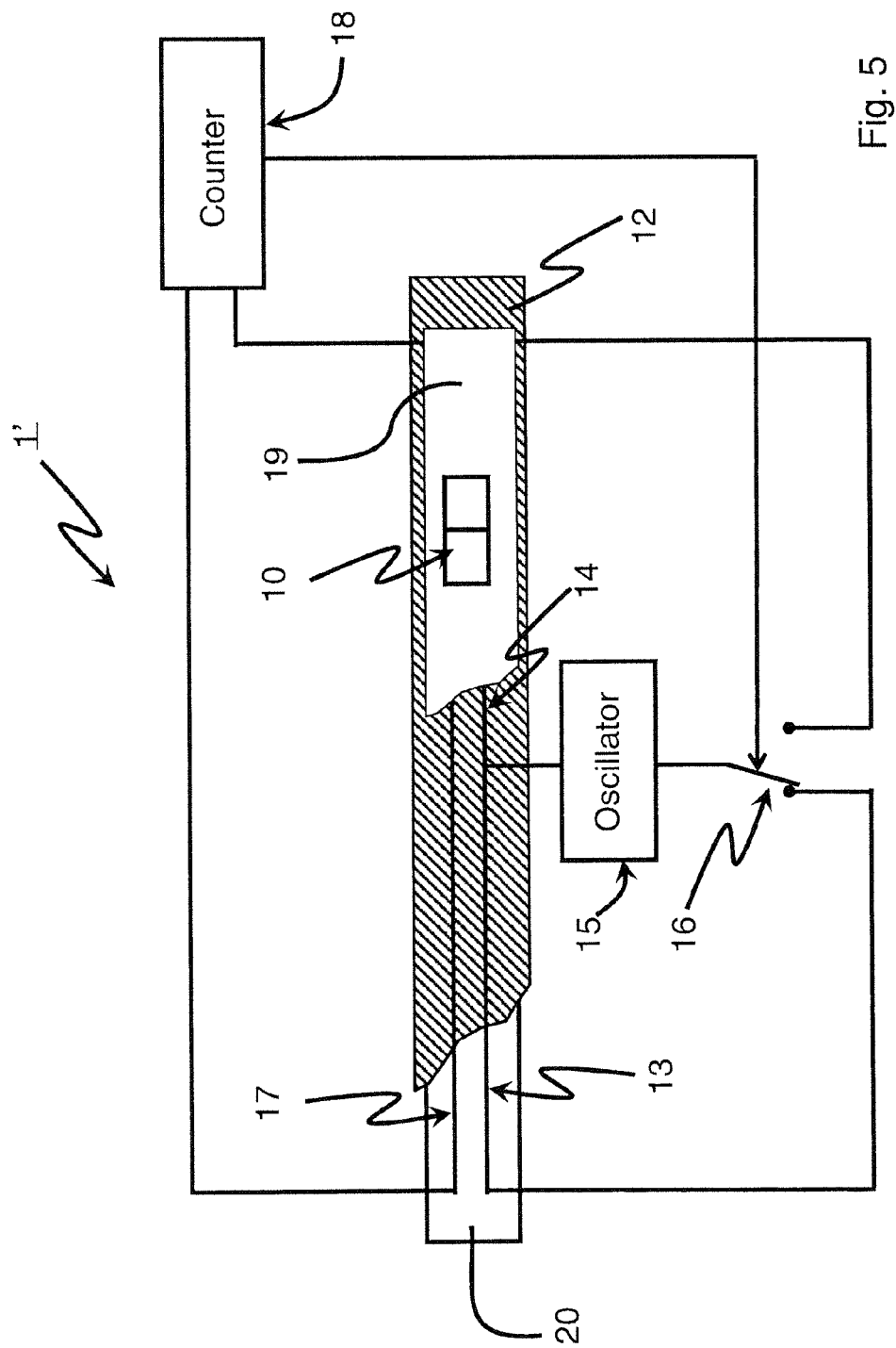

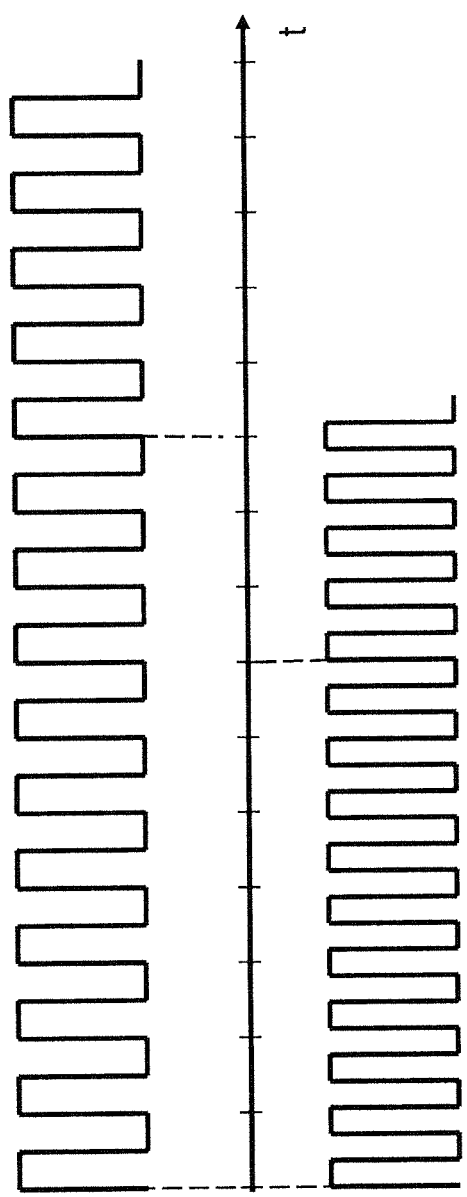

CIRCUIT SYSTEM AND METHOD FOR EVALUATING A SENSOR

BACKGROUND OF THE INVENTION

1. Field of the Invention

The invention relates to a circuit system for evaluating a sensor, wherein the circuit system has two complex impedances, wherein the complex impedances are each part of an oscillating circuit in which the complex impedances can be excited to oscillations and wherein at least one of the two complex impedances is a component of the sensor. In addition, the invention relates to a corresponding method.

2. Description of Related Art

Inductive sensors are widely used in practice. In this case, the reaction of a measured object is detected on a sensor coil and suitably converted into a measuring signal. Very frequently inductive sensors in the form of eddy current sensors are used that induce eddy currents in a conductive measured object located in the influence area of the sensor, which reacts to the sensor coil. Other sensors detect the change in inductance of the sensor coil caused by ferromagnetic materials. Inductive sensors are frequently used as position or proximity sensors.

During the evaluation of these sensors, the sensor coils are generally expanded to form an oscillating circuit and excited to oscillations. A measured object to be detected leads to a change in inductance of the sensor coil, whereby the frequency of the oscillation changes. By detection of the frequency detuning, the approach or the presence of a measured object can be concluded and, depending on the design of the sensor, a position and/or position change of the measured object or the respective physical variable to be measured is determined. Frequently the evaluation occurs by means of a PLL (phase-locked loop) that detects the deviation between an excitation frequency and the oscillation frequency of the oscillating circuit.

What is disadvantageous in the method for evaluating an inductive sensor known from practice is that the circuits necessary for this generally have a relatively complicated structure. For one thing, this causes a susceptibility to errors and, for another, the evaluation circuits cannot practically be used in the low cost area. Because of this, some application areas, e.g. the motor vehicle, are ruled out. Especially with the use of PLL circuits, the high temperature sensitivity also has a noticeable negative effect. In addition, the accuracy of the measuring results depends on the stability of the voltage supply of the circuit used, so complicated stabilizing measures are necessary.

Another general type of frequently used sensors uses a capacitive effect. In this case, the reaction of a measured object to the capacitance of a sensor is detected. Here as well the evaluation generally occurs with the use of an oscillating circuit, the characteristic values of which (frequency, amplitude and/or phase) change due to the measured object. The changes are usually determined by phase or amplitude modulation or by frequency measurements.

What is disadvantageous with the known circuits is that they are dependent on the voltage supply. Therefore, complicated measures are necessary in order to adequately stabilize the supply voltage. This in turn leads to comparatively complicated and expensive circuits that cannot be used in the low cost area.

SUMMARY OF VARIOUS EMBODIMENTS

Therefore, the present invention is based on the object of designing and further developing a circuit system and a method of the type mentioned at the beginning in such a way that the evaluation of an inductive or capacitive sensor or—generally stated—the evaluation of a sensor with a complex impedance can be implemented at low costs with simple circuit technology means.

According to the invention, the object above is achieved by the various embodiments described herein. According to this, the circuit system in question is characterized in that a counter and a switching apparatus are provided, whereby the oscillations of one of the two oscillating circuits can be counted alternately with the counter, that upon reaching a counter status that can be specified, the switching apparatus can be switched and that the switching signal of the switching apparatus serves as a pulse-width-modulated output signal of the circuit system.

With regard to the process, the object above is achieved by the various method embodiments described herein. According to this, the method in question is characterized in that by means of a counter, the oscillations of one of the oscillating circuits can be counted alternately, that when a counter status that can be specified is reached, a switching apparatus is actuated and there is a change for counting the oscillations of the other oscillating circuit and that the switching signal of the switching apparatus is output as a pulse-width-modulated output signal.

In the manner of the invention, it was first recognized that inductive and capacitive sensors can be evaluated in a deceptively simple manner. To do this, a circuit system is used that has at least two complex impedances. At least one of the two complex impedances is a constituent of the sensor to be evaluated and is formed by a sensor coil or a capacitor structure of the sensor. Each of the complex impedances is part of an oscillating circuit that oscillates at a frequency dependent on the complex impedance. The oscillations of the two coils are evaluated in the simplest manner by means of a counter. The counter counts the number of rising or falling edges of the oscillations in the oscillating circuit. Alternatively, the rising and falling edges or other elements characterizing the oscillation, like exceeding a threshold value, can be evaluated. In addition, a switching apparatus is provided in the circuit system that ensures alternate counting or alternate excitation of the oscillating circuits. The switching apparatus is designed in such a way that it can be switched depending on the counter status of the counter. The switching signal of the switching apparatus can be output from the switching apparatus as an output signal.

During operation of the circuit system, according to the invention first the number of oscillations of one of the two oscillating circuits is counted. When a specified counter status n is reached, the switching apparatus is activated. The limit value of the counter status can be selected on the basis of the respective measurement conditions and can depend on the oscillating frequency of the oscillating circuit, the desired frequency of the output signal, the extent of the interference load on the sensor signal, the desired dynamics of the output signal and other limiting conditions. In order to achieve high dynamics, lower limit values should be selected. One possible limit value lies at 512 or 1,024 oscillations, to name two possible limit values that are especially easy to evaluate with digital means. However, far lower values (down to a few oscillations) or far greater values (with very high frequency oscillations in the oscillating circuit) as well as non-binary values are conceivable.

With the activation of the switching apparatus, the counting of the oscillations is changed to the other oscillating circuit. When the counter status n is reached, the switching apparatus is activated again and there is a change back to counting the first oscillating circuit. The previously described steps start again so that the oscillations of one oscillating circuit and the oscillations of the other oscillating circuit are detected alternately.

Since the period lengths are shorter at high frequencies than at low frequencies, counting of the n oscillations requires a period of time that is dependent on the frequency of the oscillation. Because of this, the oscillating frequencies of the two oscillating circuits can be put in a relationship to each other in the simplest manner in that the total, the difference or the ratio of the time periods required for counting the n oscillations is formed. According to the invention, this can occur in that the switching signal of the switching apparatus is output as an output signal. The switching signal could, for example, assume a high level during counting of one oscillating circuit while a low level would be present during counting of the other oscillating circuit. In this way, a pulse-width-modulated output signal develops that reflects the mutual relationship of the time periods of the counts and thus the oscillating frequencies of the two oscillating circuits. From this information, conclusions can be drawn regarding the complex impedance, whereby the inductance or capacitance can be evaluated in a deceptively simple manner. Since only cost-effective circuit components are used, a circuit system can be implemented that is cost-effective to manufacture. Expensive and sensitive precision components are not needed in the circuit system according to the invention.

The frequency range for the output signal can be specified very simply by the selection of the limit value for the counter. High limit values reduce the frequency of the output signal with reference to the oscillating frequency of the oscillating circuits; for low limit values, the frequencies lie relatively close to each other. The selection of the limit value of 512, for example, can lead to a reduction of the frequency of the output signal to one-thousandth in comparison to the frequency of the oscillating circuit. If the two oscillating circuits oscillate, e.g. at 1 MHz, an output signal results that has a frequency of approx. 1 kHz. Higher limit values lead to an even greater frequency reduction. Because of this, the costs of an evaluation can be further reduced.

The counter can be designed in various ways known from conditions in practice. Simple digital modules can also be used like microcontrollers with integrated counters. The only prerequisite of the counter is that the edges can be counted at suitably high frequency. However, this can be fulfilled easily.

According to one design of the invention, the second complex impedance of the switching apparatus can be designed as a reference impedance. With an inductive sensor, this is formed by a reference coil, for a capacitive sensor by a reference capacitance. A reference coil is preferably designed as an air core inductor. In both cases, the reference impedance is designed in such a way that it is not influenced by a measured object. For example, this impedance could be used for the compensation of temperature influences or interferences due to the respective installation environment. In principle, the reference impedance could be mounted wherever desired. In principle, a mounting below the sensor electronics is also conceivable.

Preferably the reference impedance is set up in a manner similar to the first complex impedance serving as a sensor element. Because of this, the two impedances are influenced in a similar manner, e.g. with respect to temperature-related changes. In addition, the two oscillating circuits can be set up in a similar manner, which means that a comparable oscillation behavior of the two oscillating circuits results.

According to another design of the invention, the second impedance of the circuit system could be designed as part of the sensor. The sensor would thus have two coils or two capacities that can be used in the form of a differential sensor. In this way, it is possible to detect a displacement of a measured object with respect to the two impedances. In addition, a differential arrangement offers the option of eliminating temperature-related interferences or electromagnetic interferences in a known way.

For example, with an inductive sensor, if the measured object moves in a direction along the connecting line of the two coils, the influence of the measured object with respect to both coils changes. While the influence on one sensor coil is reduced, the measured object influences the other sensor coil to a greater extent. Because of this, the frequencies of the two oscillating circuits change in opposite directions, i.e. the frequency of one oscillating circuit increases while the frequency of the other one drops. Because of this, a clear offset of the duty factor of the pulse-width-modulated (PWM) output signal of the circuit system occurs. The duty factor of a PWM signal is understood to mean the relationship between the time of a high level and the period length of the PWM signal. Corresponding statements apply for a capacitive sensor.

According to another design of the invention, the two designs previously described could be combined. Accordingly, the circuit system would have three complex impedances, of which two impedances are part of the sensor and one impedance functions as a reference. The two sensor impedances could form a differential sensor while the reference impedance could be used for compensation.

The following statements relate to an inductive sensor and especially to a design that has proven to be especially advantageous in connection with the circuit system according to the invention. However, the individual aspects shown—even without explicit reference and thus being transferable—also apply for the use of a capacitive sensor. To prevent repetition, parallel statements are largely avoided. In the following, the complex impedances are formed by coils.

With regard to a simplification of the manufacturing process, the coils of the circuit system can be designed as planar coils. These coils could be mounted on a substrate. The substrate could be a circuit board, a ceramic but also plastic part, plastic films, metal parts or other materials suitable as substrate materials. The only prerequisite is that electrical insulation with respect to the coil can be achieved. However, in general this can be produced easily even with metallic substrate materials in that an insulation layer is mounted between substrate and coil. For metallic substrates, it is additionally necessary that the substrate material have no ferromagnetic properties. As can already be seen from the listing of possible substrates, these can be designed so that they are rigid or flexible. In turn, this increases the number of possible usage areas of the circuit system.

The circuit system according to the invention yields especially good measuring results with high resolution and dynamics if—according to a very specific preferred further development—a soft magnetic film or a soft magnetic thin layer, which has a permeability that changes under the influence of a magnetic field depending on the field intensity of the magnetic field, is mounted in the influence area of the sensor coil. Because of this, a definite progression of permeability of the soft magnetic film/thin layer is adjusted depending on an external magnetic field. To a great extent, this provides for a change in the inductance of the coil, which in turn leads to a greater influence on the duty factor of the pulse-width-modulated output signal of the circuit system. The change in permeability can extend up to saturation, in which the soft magnetic film/thin layer is transparent for magnetic fields. The selection of a soft magnetic film or a soft magnetic thin layer depends on the respective usage conditions and the manufacturing process. As soft magnetic material that can be used for forming the soft magnetic film or the soft magnetic thin layer, amorphous or nanocrystalline materials can be used.

To increase the effect, a soft magnetic film or a soft magnetic thin layer can be mounted on both sides of the sensor coil. Because of this, with the presence of a magnet, two soft magnetic film/thin layers would each experience a change in permeability, whereby the influence of the magnet on the sensor coil greatly increases. In this case, a soft magnetic film could also be glued on one side of the sensor coil while on the other side of the sensor coil a soft magnetic thin layer is mounted.

With respect to a further increase of the measuring effect, on the side of the soft magnetic film/thin layer turned away from the sensor coil, a conductive layer could be mounted. If a magnet causes a change in permeability in the soft magnetic film/thin layer, an alternating field created by the sensor coil could penetrate partially through the soft magnetic film/thin layer and induce eddy currents in the conductive layer. These eddy currents create a reaction to the sensor coil which, with the presence of an external magnet, leads to a greater change of the impedance and thus to a greater change of the duty factor of the output signal.

If two sensor coils are present, soft magnetic films/thin layers could be provided for both sensor coils, on one side or both sides of the coils. In this case, for example with the arrangement of both sensor coils in one plane, a common soft magnetic film/thin layer could cover both sensor coils. However, the films/layers can also be designed separately for each of the coils so that the films/layers have no connection to each other. This generally depends on the respective dimensioning of the sensor.

With the use of a conductive layer and a soft magnetic film/thin layer on both sides of the sensor coil(s), the conductive layer could also be mounted on both sides of the sensor coil(s), in each case on the sides of the soft magnetic film/thin layer turned away from the sensor coil.

For the use of this sensor as a position or distance sensor, the measured object to be detected could be provided with a magnet. Because of this, the permeability of the soft magnetic film/thin layer of the sensor changes depending on the position of the measured object—possibly but not necessarily to the point of saturation in one area of the film/layer—whereby the inductance changes in relationship to the position of the measured object and/or the assigned magnet.

On one hand, the magnet assigned to the measured object could be designed as a permanent magnet, or on the other a coil with direct current flowing through it could assume the function of the magnet. For the use of this sensor, the only thing that is decisive is that in the area around the measured object a magnetic field can be generated that influences the permeability of the soft magnetic film and/or the soft magnetic thin layer of the sensor greatly enough. A sensor based on this principle is disclosed in WO 2008/074317 A2, to the contents of which reference is now made.

With regard to a possible design of the oscillating circuits of the circuit system, the oscillating circuit could be designed as a resonant oscillating circuit. This could be created by connection in parallel or in series of a capacitor with each one of the coils as parallel or series oscillating circuit. The oscillating frequency of the oscillating circuit would be defined by the capacitance of the capacitor and the inductance of the coil. In the case of a capacitive sensor, the capacitance of the sensor would be supplemented by a coil that is connected in parallel or serially to form an oscillating circuit.

According to another design of the oscillating circuits, a multivibrator could be used, the oscillating frequency of which is defined by the inductance of the respective associated coil. What is advantageous in this design is that the use of an additional capacitor, whose capacitance is generally influenced by the temperature, can be dispensed with. A multivibrator can also be used for capacitive sensors.

Preferably the oscillating circuits are dimensioned in such a way that in the usual operating situation, an oscillating frequency of the oscillating circuits is between 100 kHz and 20 MHz. This frequency range proves to be especially advantageous in order to be able to influence the sensor as an eddy current sensor. In addition, in this range, a relatively high resolution of the evaluation circuit can be achieved. However, frequencies outside this range are also conceivable. In spite of the relatively high frequency of the counting, cost-intensive measures in the evaluation of the output signal can still be avoided since the frequency of the pulse-width-modulated output signal of the circuit system assumes significantly lower frequencies for the switching process of the switching apparatus depending on the counter status used.

For evaluation of the output signal of the circuit system, the output signal can be low-pass-filtered and from the analog output signal occurring from this an analog value representing the duty factor can be obtained. Alternatively or additionally, the duty factor can be used, i.e. the relationship between a high level of the output signal in relationship to the entire period length of the output signal and the period length of the output signal.

With the use of the circuit system according to the invention or the method according to the invention in connection with a position sensor, the position of the measured object could be determined from the low-pass-filtered output signal or from the duty factor of the output signal. With the use of only one sensor coil, the change in the output signal represents the influence of the measured object on the sensor. With the use of two sensor coils, the relative position of the measured object with respect to the two sensors is output by the duty factor. If the measured object is located on the center plane between the two sensor coils, the inductance of both sensor coils will be influenced to the same extent by the measured object. In this way, a duty factor of approx. 0.5 will occur, i.e. both sensor coils oscillate at approximately the same frequency. If the measured object moves within the connecting plane or along the connecting line between the two coils from this center position, the oscillation frequency of one oscillating circuit will increase while that of the other oscillating circuit is reduced. Because of this, the duty factor is offset to higher or lower values depending on the direction of motion. With a changed duty factor, the value of the low-pass-filtered output signal will also change. In this way, a conclusion regarding the position of the measured object can be made from the duty factor and/or from the low-pass-filtered output signal.

If the sensor is designed with two sensor coils, a decision can be made regarding the distance of the measured object relative to the connecting line between the two coils from the period length of the output signal. Depending on the distance of the measured object, the influence of the measured object on both coils changes simultaneously. Because of this, the frequency of the two oscillating circuits changes depending on the distance of the measured object from the sensor. Since the pulse-width-modulated output signal of the circuit system represents the frequencies of the oscillating circuits, the output signal will change depending on the distance of the measured object from the sensor. This is reflected in the period length of the pulse-width-modulated output signal. From this, a statement can be made from the period length regarding the distance of the measured object from the sensor.

The switching apparatus of the circuit system could be used in various ways. For one thing, the switching apparatus could be used to excite one of the two oscillating circuits alternately. In this case, the energy supply for the oscillating circuits would only have to be changed. However, it would also be conceivable to combine individual components of the two oscillating circuits. So, for example, the switching apparatus could only switch between the first and the second coil while the other part of the oscillating circuits, e.g. the remaining parts of the multivibrator or the capacitor of the resonance oscillating circuit, could be mutually used for both oscillating circuits.

Alternatively, both oscillating circuits could be excited simultaneously while the switching apparatus alternately connects one of the two oscillating circuits to the counter. Because of this, more complex circuit technology would in fact be necessary, but the oscillating circuits would always be in steady state so that the transient response during activation of an oscillating circuit would not have to be considered.

Which of the two applications of the circuit system shown is used will mainly depend on the respective application area. In the low cost area in which it is a matter of avoiding unnecessary components, it is reasonable to combine individual components of the oscillating circuits.

Another option of the design consists in that the oscillations of the two oscillating circuits are counted in parallel by two separate counters. In this way, the two independent oscillating circuits are counted independently of each other. This leads to a case in which the switching apparatus only switches back and forth between the use of the counter statuses of one counter and of the other counter and generates the pulse-width-modulated output signal.

With the use of two counters, a frequency evaluation of the output signal can also be performed. To do this, the number of oscillations of a third oscillating circuit with known frequency could be used to trigger a readout of the counter statuses of the two other counters. To do this, a third counter counts the oscillation of the third oscillating circuit up to a limit value that can be specified. When it is reached, the counter statuses of the two other counters are read out and the frequency of one or both oscillating circuits is determined based on these counter statuses. For this purpose, the relationship of the counter statuses of the third counter is determined in relationship to the two other counters, and from that the respective other frequencies are calculated. This evaluation could be performed using a microcontroller in that the counter can also be implemented. The cycle frequency of the microcontroller can be used as the known third frequency.

With implementation of the three counters in a microcontroller, components can be eliminated. However, the microcontroller cycle frequency that is used must be adequately high in order to be able to implement the two-level counter arrangement with the desired dynamics. Alternatively, it would be possible to use separate counter modules in a single microcontroller with a low cycle frequency. Because of the use of separate counters in the first step, the signal is already divided by the selected limit value for the counter, e.g. 1,024, so that the microcontroller at lower frequency can evaluate the time of the high and/or low portions of the switching signal in the manner described.

The advantage of the two-step counter arrangement is that the useful bandwidth of the sensor is doubled since both signals are present simultaneously to both oscillators.

In another design of frequency evaluation with the use of two counters, the relationship of the two counters with respect to each other could be determined. For this purpose, both counters could count the oscillations of the two oscillating circuits in parallel, whereby when one counter reaches a limit value that can be specified, it triggers the readout of the other counter. From the relationship of the two counter statuses, the ratio of the two frequencies can be determined. Advantageously, no more computation is required with this since a relative result is directly available. Conclusions can be drawn about which of the two oscillating circuits oscillates faster than the other by determining which of the two counters has triggered the readout of the other counter.

In an advantageous manner, when a specified limit value is reached, one counter is reset to a starting value. This will advantageously lie at zero. However, any other desired values can be used that work well with the respective counters used. Thus, the starting value can be set to a maximum value. Which starting value depends not least on whether the counter counts upward or downward. Both counting directions can be used with the method according to the invention and the circuit system according to the invention.

With the use of several counters, when the limit value is reached by one counter, the other counter could also be reset.

It should be made clear that as the starting signal of the suggested circuit system, not only can the analog PWM signal be used, but the digital counter signal can be output as a direct measurement for the measuring variables described.

BRIEF DESCRIPTION OF THE SEVERAL VIEWS OF THE DRAWINGS

There are now various possibilities for designing and further developing the teaching of the present invention in an advantageous manner. For this purpose, on one hand reference is made to the various embodiments described herein and on the other to the following explanation of preferred exemplary embodiments of the invention using the drawing. In connection with the explanation of the preferred exemplary embodiments of the invention using the drawing, generally preferred designs and further developments of the teaching will be explained. In the drawings FIG. 2 shows the first exemplary embodiment in a side view of the sensor elements, FIG. 3 shows the sensor elements according to FIG. 2 together with signal curves that reflect the effect of a movement of a measured object in the connecting plane of the two coils, FIG. 4 shows the sensor elements according to FIG. 2 together with signal curves, wherein in this case the effects of a movement of a measured object perpendicular to the connecting plane in a center plane between the coils is reflected, FIG. 5 shows a second exemplary embodiment of a circuit system according to the invention, FIG. 6 shows a diagram of an example wave train with two different frequencies and FIG. 7 shows a diagram with example wave trains with two different frequencies as well as a pulse-width-modulated output signal resulting from them.

DETAILED DESCRIPTION

Figure 1:
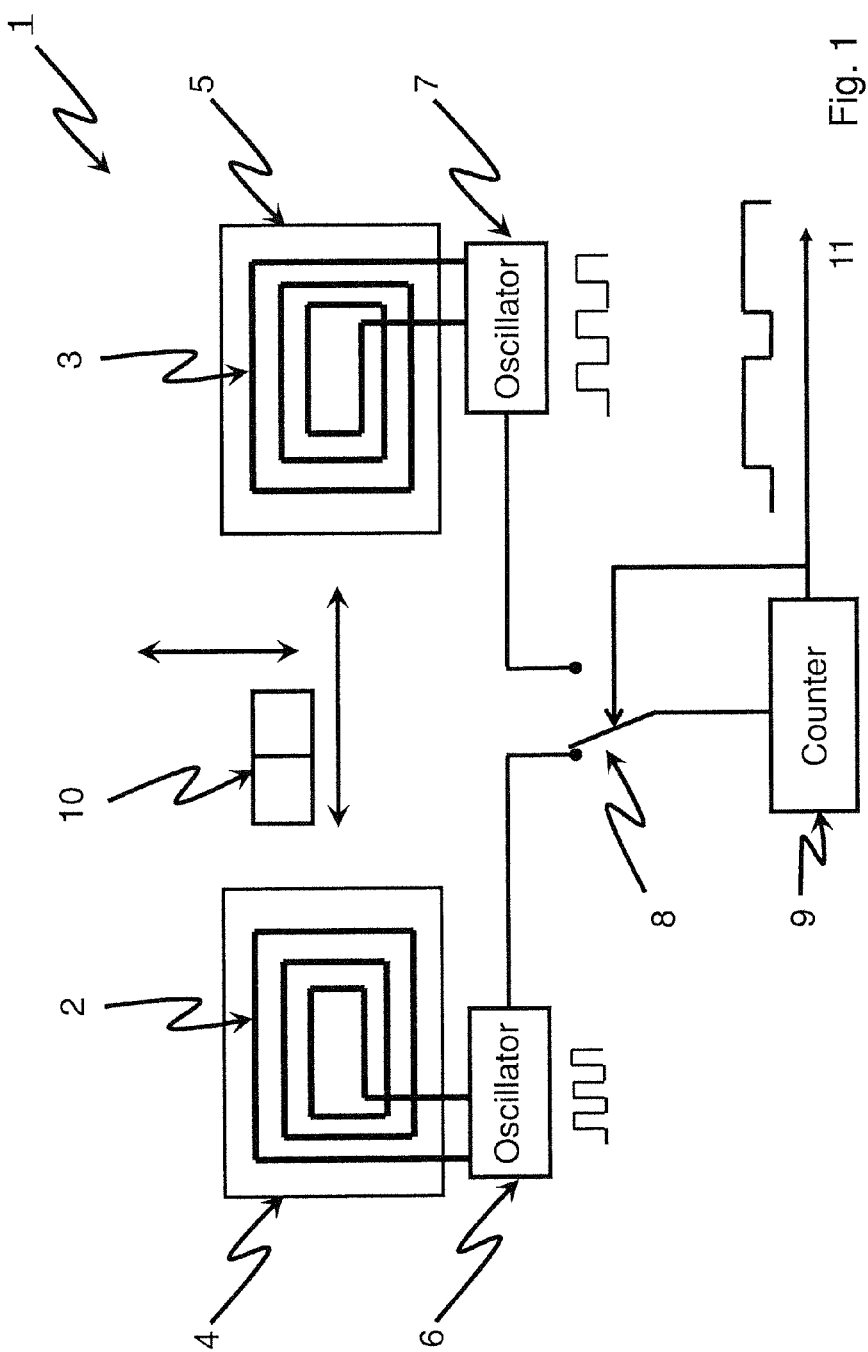
FIG. 1 shows a first exemplary embodiment of a circuit system according to the invention in a view with associated circuit elements.

FIG. 1 shows a first exemplary embodiment of a circuit system 1 according to the invention. The circuit system 1 has a first sensor coil 2 and a second sensor coil 3. Both sensor coils are each mounted on a soft magnetic film 4, 5 so that this acts as a substrate. The sensor coils 2, 3 are each connected with an oscillator 6, 7 in the form of a multivibrator, which in connection with the associated sensor coil 2, 3 forms a first and a second oscillating circuit. The oscillating circuits each oscillate at a frequency that is determined by the inductance of the associated coil and that is each output from the oscillators 6, 7. These outputs are supplied to a switching apparatus 8 that alternately switches the signal counting of the oscillators 6, 7 to a counter 9. The counter generates a switching signal that is fed back to the switching apparatus 8 and controls the activation of the switching apparatus.

Between the sensor coils 2, 3, a measured object is arranged to which a magnet 10 is assigned. For the sake of clarity in FIG. 1, the measured object is not shown. In principle, the measured object can be designed so that it is optionally movable in all three spatial directions. However, to improve the measuring accuracy, it is desirable if only motion directions along the connecting line between sensor coils 2, 3, i.e. in the horizontal direction in the figure, are possible, while motion in the vertical direction and perpendicular to the drawing plane are only permitted to a very small extent. In any case, the method according to the invention and the circuit system according to the invention can also be used in principle for the type of motions that have been described above.

Below each of the oscillators 6, 7, an example wave train is shown that reflects the oscillation frequencies of the oscillators. The resulting switching signal that is output as output signal 11 is shown in the lower right part of FIG. 1.

During operation of the circuit system according to FIG. 1, the counter 9 counts a number that can be specified of oscillations of the oscillator 6. This can be, e.g. 1,024 oscillations. As soon as the $1,024^{th}$ rising edge is detected, the counter 9 changes the switching signal, whereby the switching apparatus 8 is ordered to change to the other input. In addition, the counter is reset to the counter status zero. After that, the counter 9 counts the oscillations of oscillator 7. As soon as the $1,024^{th}$ rising edge is detected, the counter 9 changes the switching signal for the switching apparatus 8 again, whereby the counter 9 is connected with oscillator 6 again and the counting of the first oscillating circuit starts again. This alternating counting is performed continuously.

From the switching signal that is output as output signal 11, it can be recognized that during counting of the oscillator 7 a high level is generated, while during counting of the oscillator 6 the output signal 11 assumes a low level. The duty factor of this pulse-width-modulated output signal depends on the inductance of the two sensor coils and thus on the position of the magnet 10. If the magnet 10 is shifted to the left, the oscillation frequency of oscillator 6 increases and the frequency of oscillator 7 drops. Because of this, the duty factor of output signal 11 shifts.

FIG. 2 shows the sensor part of the circuit system according to FIG. 1 in a side view. The coils 2, 3 have a distance $D_{Sp}$ from each other. At the distance $d_{Mag}$ to the connecting line between sensor coil 2 and sensor coil 3, the magnet 10 is shown which can move in the horizontal direction. The magnet is mounted in such a way that the magnetic field lines run essentially parallel to the connecting line of the coils. The sensor has a length of $L_{Mag}$. With this sensor, a measuring range of $MB = D - L_{Mag}$ can be covered.

FIGS. 3 and 4 show the effects of a motion longitudinally and transversely to the connecting line between the two coils in the sensor arrangement according to FIG. 2. The magnet 10 is shown in a first position with solid lines. With dotted lines, the magnet 10 is shown after a shift into a second position. The lower part of the figures each shows the pulse-width-modulated output signal in the first position and in the second position.

FIG. 3 shows how the pulse-width-modulated output signal changes if the magnet moves from the center position in the first position inside the connecting plane of the two sensor coils 2 and 3 in the direction of sensor coil 2. The frequency of the oscillator 6 assigned to coil 2 rises while the frequency of oscillator 7 drops. The period of time until, e.g. the counter value 1,024 is reached is thus reduced for the first oscillator and increased for the second oscillator. The associated output signals are shown in FIGS. 3B and 3C. Since the magnet 10 is located in the first position in the center position, a duty factor of the output signal of approx. 0.5 results. After the magnet 10 is shifted to the second position, the duty factor is displaced as can be seen in FIG. 3C. In this way, the duty factor of the pulse-width-modulated output signal changes while the total duration of a period remains constant: $T_1 = T_2$.

FIG. 4 shows the output signal if the distance of the magnet relative to the connecting plane in the center plane between coils 2 and 3 changes. FIG. 4B shows the output signal in the first position while FIG. 4C shows the output signal in the second position. The frequencies of the two oscillators 6 and 7 change in the same way. Because of this, the duty factor, i.e. the relationship from high to low level, remains constant while the total duration of a period clearly changes: $T_1 < T_2$.

FIG. 5 shows a second exemplary embodiment of a circuit system 1'. On a substrate 12, a sensor system is mounted that operates according to a transformational principle. The first and the second sensor coil are reduced to a minimum, namely to two conductor sections 13, 14. The first conductor section 13 functions here as the first sensor coil, while the second conductor section 14 serves as the second sensor coil. The two conductor sections 13, 14 have a common point that is connected to oscillator 15. The opposite pole of the oscillator is connected to a switching apparatus 16 that alternately switches to the other end of the first conductor section 13 and the second conductor section 14.

Another conductor section 17 is arranged opposite the first and the second conductor sections 13, 14, which receives the electromagnetic waves sent out by the first conductor section 13 and/or the second conductor section 14 and forwards the corresponding pulses to the counter 18. To influence the electromagnetic coupling between the first and/or second conductor sections 13, 14 and the conductor section 17, a soft magnetic film 19, 20 is mounted above and below the substrate. On the side on which the conductor sections 13, 14 and 17 are mounted, an insulation layer is additionally applied that produces electrical insulation between the conductor sections and the soft magnetic film.

The operation of the circuit system runs according to the circuit system according to FIG. 1. In a first switch position, the first conductor section 13 is excited to oscillations by the oscillator 15. The alternating current flowing through the first conductor section 13 generates an electromagnetic alternating field that is coupled to the conductor section 17 by way of the soft magnetic film 19, 20. There the field induces an alternating voltage of the same frequency that is processed by counter 18. Counter 18 counts the rising edges of voltage received by conductor section 17. As soon as a specified number of oscillations is reached, for example 512, that have been counted by counter 18, it generates the switching signal for the switching apparatus 16. The switching apparatus 16 changes the switch setting and after that provides the second conductor section 14 with energy. The alternating current now flowing in the second conductor section 14 in turn generates an electromagnetic field that is coupled to the connector section 17 by way of the soft magnetic film 19, 20, and there in turn an alternating voltage with the same frequency is generated. The rising edges of this induced alternating voltage are in turn counted by counter 18. After a specified number of oscillations is reached, in the example above 512, the counter in turn changes the switching signal for the switching apparatus 16, whereby the switching apparatus is reset to the first switching position and the process described starts from the beginning. The switching signal generated by the counter 18 for the switching apparatus 16 is output as output signal 21 of the circuit system 1'.

Along the sensor arrangement, a measured object is arranged so that it can move to which a magnet 10 is assigned, whereby the north-south direction points in longitudinal direction to the conductor sections 13, 14 and 17. The magnet 10 brings the soft magnetic films 19 and 20 locally to saturation or at least leads to a considerable local change in permeability, whereby the films in an area close to the magnet 10 are partially permeable for electromagnetic fields. In this way, for one thing, the electromagnetic coupling between the conductor sections 13 and/or 14 and 17 changes, and for another the inductance that the conductor sections 13 and 14 have changes. This change in the inductance leads in turn to a detuning of the oscillating circuits that are formed by the conductor sections 13 and 14 and the oscillator 15.

Figure 7:
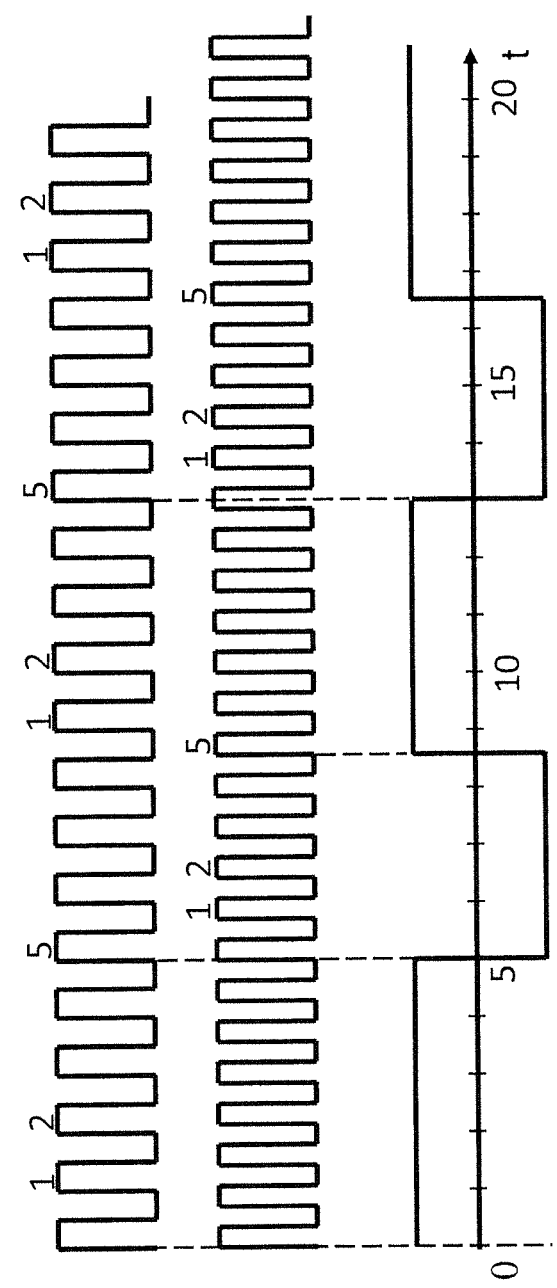

FIGS. 6 and 7 again show the generation of the pulse-width-modulated output signal 11. In FIG. 6, as an example, two wave trains each with 15 rising edges are shown, whereby the upper curve has a lower frequency than the lower curve. It can be seen clearly that for oscillations at lower frequency, a longer period of time is required than for the oscillations at higher frequency. This is used during the generation of the pulse-width-modulated output signal as shown in more detail in FIG. 7. When the fifth rising edge of the upper oscillator curve is reached, the switching apparatus switches to the second oscillator curve (FIG. 7 center) and counts the oscillations there. As soon as the fifth rising edge is reached, there is a changeover again and the first oscillator counts the rising edges. When the fifth rising edge is reached, there is a changeover again, etc. In the result, there is a pulse-width-modulated output signal as shown at the bottom of FIG. 7.

With respect to other advantageous designs of the apparatus according to the invention, to prevent repetition, reference is made to the general section of the description and to the attached patent claims.

Finally, it is explicitly stated that the exemplary embodiments described above of the apparatus according to the invention serve only as an explanation of the claim teaching, but this is not restricted to the exemplary embodiments.

The invention claimed is:

1. A circuit system for evaluating a sensor, said circuit system comprising:
   two complex impedances, whereby the complex impedances are each part of an oscillating circuit in which the complex impedances are excited to oscillations and wherein at least one of the two complex impedances is a component of the sensor,
   wherein a counter and a switching apparatus are provided, whereby with the counter alternately the oscillations of one of the two oscillating circuits is counted, wherein when a predetermined counter status is reached, the switching apparatus is switched, wherein the switching signal of the switching apparatus serves as a pulse-width-modulated output signal of the circuit system, and wherein the oscillating circuits are designed as multivibrators, the time constants of which are each determined by a respective associated complex impedance and a respective resistor.

2. The circuit system according to claim 1, wherein the second complex impedance is designed as a reference impedance.

3. The circuit system according to claim 1, wherein the two complex impedances are components of the sensor.

4. The circuit system according to claim 3, wherein the sensor is designed as a differential sensor.

5. The circuit system according to claim 1, wherein the complex impedances are formed by coils.

6. The circuit system according to claim 5, wherein the coils are designed as planar coils.

7. The circuit system according to claim 5, wherein in the influence area of at least one of the coils of the sensor, a soft magnetic film or a soft magnetic thin layer is mounted, the permeability of which changes under the influence of a magnetic field depending on the field intensity of the magnetic field.

8. The circuit system according to claim 7, wherein on both sides of at least one of the coils, a soft magnetic film and/or a soft magnetic thin layer is mounted.

9. The circuit system according to claim 7, wherein on the side of the soft magnetic film/thin layer turned away from the coil a conductive layer is mounted, whereby the soft magnetic film/thin layer is electrically insulated with respect to the conductive layer.

10. The circuit system according to claim 1, wherein a magnet is assigned to a measured object to be detected.

11. The circuit system according to claim 10, wherein the magnet comprises a permanent magnet or a coil with direct current flowing through it.

12. The circuit system according to claim 1, wherein the oscillating circuits are each formed by parallel or series connection of one of the coils with a capacitor.

13. The circuit system according to claim 1, wherein the components of the oscillating circuits are selected in such a way that a frequency between 100 kHz and 20 MHz occurs.

14. A method for evaluating an inductive sensor using a circuit system, said method comprising:
   providing a circuit system that has two complex impedances, each of which is part of an oscillating circuit, and wherein at least one of the two complex impedances is a component of the sensor, wherein by means of a counter, the oscillations of one of the oscillating circuits is counted alternately, wherein in each case when a predetermined counter status is reached, a switching apparatus is activated and there is a changeover to the other oscillating circuit for counting the oscillations of the other oscillating circuit, wherein the switching apparatus is output as a pulse-width-modulated output signal, and wherein the oscillating circuits are designed as multivibrators, the time constants of which are each determined by a respective associated complex impedance and a respective resistor.

15. The method according to claim 14, wherein the method is used in connection with the position sensor that determines the position of a measured object.

16. The method according to claim 14, wherein a position of a measured object is determined from the low-pass-filtered output signal or from the duty factor of the output signal.

17. The method according to claim 14, wherein the distance $d_{Mag}$ of the measured object from the sensor is determined from the period length of the output signal.

18. The method according to claim 14, wherein the complex impedances are formed by coils, and wherein one coil is used as a reference coil.

19. The method according to claim 14, wherein the switching apparatus is used for alternating excitation of the two oscillating circuits.

20. The method according to claim 14, wherein the oscillating circuits are excited simultaneously and wherein b the switching apparatus switches the connection to the counter alternately between each of the oscillating circuits.

21. The method according to claim 14, wherein the number of oscillations of the two oscillating circuits is counted in parallel by two counters.

22. The method according to claim 21, wherein for frequency evaluation of the output signal, the number of oscillations of a third oscillating circuit with known frequency is used for triggering a readout of the counter statuses of the two counters and wherein based on the counter statuses, the frequency of one or both oscillating circuits is determined.

23. The method according to claim 21, wherein for frequency evaluation of the output signal, when a predetermined limit value is reached on one of the two counters, the counter status of the other counter is called up and used for frequency evaluation.

24. The method according to claim 14, wherein the counter is reset to a starting value when it reaches a limit value.

25. The method according to claim 14, wherein the complex impedances are formed by coils, and wherein one coil is used for temperature compensation.

* * * * *